United States Patent
Day, III et al.

(10) Patent No.: US 7,958,517 B2
(45) Date of Patent: Jun. 7, 2011

(54) APPARATUS, SYSTEM, AND METHOD FOR EXECUTING FUNCTIONS IN AN EVENT DRIVEN ENVIRONMENT FROM A CO-ROUTINE ENVIRONMENT

(75) Inventors: Kenneth F. Day, III, Tucson, AZ (US);
Douglas W. Dewey, Tucson, AZ (US);
Eddie Lin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1169 days.

(21) Appl. No.: 11/626,242

(22) Filed: Jan. 23, 2007

(65) Prior Publication Data

US 2008/0178203 A1  Jul. 24, 2008

(51) Int. Cl.
*G06F 3/00* (2006.01)
*G06F 9/44* (2006.01)
*G06F 9/46* (2006.01)
*G06F 13/00* (2006.01)

(52) U.S. Cl. ......... 719/319; 719/329; 717/107; 717/108

(58) Field of Classification Search .................. 719/315, 719/320, 319, 328, 330; 718/107–108
See application file for complete search history.

(56) References Cited

U.S. PATENT DOCUMENTS

| | | | | |
|---|---|---|---|---|
| 5,396,600 | A | 3/1995 | Thompson et al. | 395/325 |
| 5,778,059 | A | 7/1998 | Loghmani et al. | 379/243 |
| 6,721,826 | B2 | 4/2004 | Hoglund | 710/52 |
| 6,813,761 | B1 | 11/2004 | Das et al. | 717/132 |
| 6,839,824 | B2 | 1/2005 | Camble et al. | 711/173 |
| 6,999,999 | B2 | 2/2006 | Camble et al. | 709/215 |
| 2001/0037417 | A1* | 11/2001 | Meyer | 709/332 |
| 2004/0154024 | A1 | 8/2004 | Chen et al. | 719/310 |
| 2004/0221269 | A1* | 11/2004 | Ray et al. | 717/124 |
| 2004/0230794 | A1* | 11/2004 | England et al. | 713/164 |
| 2006/0015473 | A1 | 1/2006 | Swan | 707/1 |

OTHER PUBLICATIONS

Bolzle, Implementing a C++-UNO bridge, OpenOffice.org, 2004, pp. 1-35.*

* cited by examiner

*Primary Examiner* — Diem K Cao
(74) *Attorney, Agent, or Firm* — Kunzler Needham Massey & Thorpe

(57) ABSTRACT

An apparatus, system, and method are disclosed for executing functions in an event driven environment. A bridge module stores parameters and a proxy function pointer for a proxy function in a bridge structure for a co-routine context executing in a co-routine environment. The proxy function is configured to execute in an event driven environment. The bridge module also stores a bridge pointer for the bridge structure in a bridge pointer register of an event driven context structure. A swap context module swaps to the event driven context. An execute module retrieves the proxy function pointer from the bridge structure using the bridge pointer if the bridge pointer register is not null, executes the proxy function, and stores the results of the proxy function in the bridge structure.

20 Claims, 7 Drawing Sheets

APPARATUS, SYSTEM, AND METHOD FOR EXECUTING FUNCTIONS IN AN EVENT DRIVEN ENVIRONMENT FROM A CO-ROUTINE ENVIRONMENT

BACKGROUND OF THE INVENTION

1. Field of the Invention

This invention relates to executing functions and more particularly relates to executing functions in an event driven environment from a co-routine environment context.

2. Description of the Related Art

Software processes are typically designed to function in specific operating environments. For example, many software processes are designed to function in a Return On Completion (ROC) environment. In an ROC environment, a first software process may call or initiate the execution of a second software process. A context state of the first software process is saved to a stack that stores the context state in a last-in-first-out organization. The second software process executes until complete, and then retrieves the context state for the first software process from the stack. The first software process resumes execution.

Software processes may also execute in alternative environments. For example, software processes may execute in an event driven environment that may also be referred to as a real time environment. In the event driven environment, a software process swaps to another software process. The swapping between software processes is initiated and/or controlled by the executing software process as opposed to the typical externally controlled swapping initiated by interrupts or operating system intervention. The event driven environment may be configured to assure that a portion of a software process executes within a specified time interval. In one embodiment, a first software process may swap to the context of a second software process in response to any interrupt rather than call the second software process.

In addition, software processes may be designed to execute in a co-routine environment. The co-routine environment may include a small stack and restrictions on access to resources. As a result, a software process executing in the co-routine environment may more efficient employ the resources of a computing system. Co-routine software processes may also swap contexts from a first software process to a second software process without intervention from an operating system. As used herein, software processes executing in an event driven environment and/or a co-routine environment are referred to as contexts.

Some data processing devices may concurrently employ two or more environments. For example, a data processing device may employ both an event driven environment and a co-routine environment. In such a device, a co-routine environment context may need to execute a function that is configured to execute in the event driven environment. Unfortunately, executing the function in the event driven environment may swap the thread of software execution to the event driven environment prematurely, disrupting the intended instruction flow.

SUMMARY OF THE INVENTION

From the foregoing discussion, a need exists for an apparatus, system, and method that execute a function in an event driven environment from a co-routine environment. Beneficially, such an apparatus, system, and method would allow co-routine environment software processes to execute event driven environment functions.

The present invention has been developed in response to the present state of the art, and in particular, in response to the problems and needs in the art that have not yet been fully solved by currently available methods for executing functions. Accordingly, the present invention has been developed to provide an apparatus, system, and method for executing a function in an event driven environment from a co-routine environment that overcome many or all of the above-discussed shortcomings in the art.

The apparatus to execute a function in an event driven environment from a co-routine environment is provided with a plurality of modules configured to functionally execute the steps of storing a proxy function pointer in a bridge structure, storing a bridge pointer for the bridge structure in a bridge pointer register, swapping to an event driven context, retrieving the proxy pointer, and executing the proxy function. These modules in the described embodiments include a bridge module, a swap context module, and an execute module. In addition, the apparatus may include a context structure module.

The bridge module stores parameters and a proxy function pointer for a proxy function in a bridge structure for a co-routine context executing in a co-routine environment. The proxy function is configured to execute in an event driven environment. The bridge module also stores a bridge pointer for the bridge structure in a bridge pointer register of an event driven context structure. The event driven context structure stores an event driven context state for an event driven context configured to execute in the event driven environment.

The swap context module swaps to the event driven context. The execute module retrieves the proxy function pointer from the bridge structure using the bridge pointer if the bridge pointer register is not null, executes the proxy function, and stores the results of the proxy function in the bridge structure.

The swap context module further swaps to the co-routine context. The context structure module creates the event driven context structure and a co-routine context structure. The apparatus executes the proxy function in the event driven environment from the co-routine environment, allowing co-routine contexts to employ event driven environment functions.

A system of the present invention is also presented to execute a function in an event driven environment from a co-routine environment. The system may be embodied in a controller such as a storage controller employing event driven and co-routine environments. In particular, the system, in one embodiment, includes a processor module and a memory module.

The processor module executes software processes including event driven environment and co-routine environment contexts. The memory module stores the software processes. The software processes include a context structure module, a bridge module, a swap context module, and an execute module.

The context structure module creates an event driven context structure and a co-routine context structure. The bridge module stores parameters and a proxy function pointer for a proxy function in a bridge structure. In addition, the bridge module stores a bridge pointer for the bridge structure in a bridge pointer register of the event driven context structure.

The swap context module swaps to the event driven context. The execute module retrieves the proxy function pointer from the bridge structure using the bridge pointer if the bridge pointer register is not null, executes the proxy function, and stores the results of the proxy function in the bridge structure. The swap context module further swaps to the co-routine context. The system executes the proxy function in the event driven environment for the co-routine context executing in the co-routine environment.

A method of the present invention is also presented for executing a function in an event driven environment from a co-routine environment. The method in the disclosed embodiments substantially includes the steps to carry out the functions presented above with respect to the operation of the described apparatus and system. In one embodiment, the method includes storing a proxy function point in a bridge structure, storing a bridge pointer for the bridge structure in a bridge pointer register, swapping to an event driven context, retrieving the proxy pointer, and executing the proxy function.

A bridge module stores parameters and a proxy function pointer for a proxy function in a bridge structure for a co-routine context executing in a co-routine environment. The proxy function is configured to execute in an event driven environment. The bridge module also stores a bridge pointer for the bridge structure in a bridge pointer register of an event driven context structure. The event driven context structure stores an event driven context state for an event driven context configured to execute in the event driven environment.

A swap context module swaps to the event driven context. An execute module retrieves the proxy function pointer from the bridge structure using the bridge pointer if the bridge pointer register is not null, executes the proxy function, and stores the results of the proxy function in the bridge structure. The swap context module further swaps to the co-routine context. The method executes the proxy function in the event driven environment from the co-routine environment.

Reference throughout this specification to features, advantages, or similar language does not imply that all of the features and advantages that may be realized with the it present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention executes a function in an event driven environment from a co-routine driven environment. The present invention allows co-routine contexts to employ functions designed for the event driven environment. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
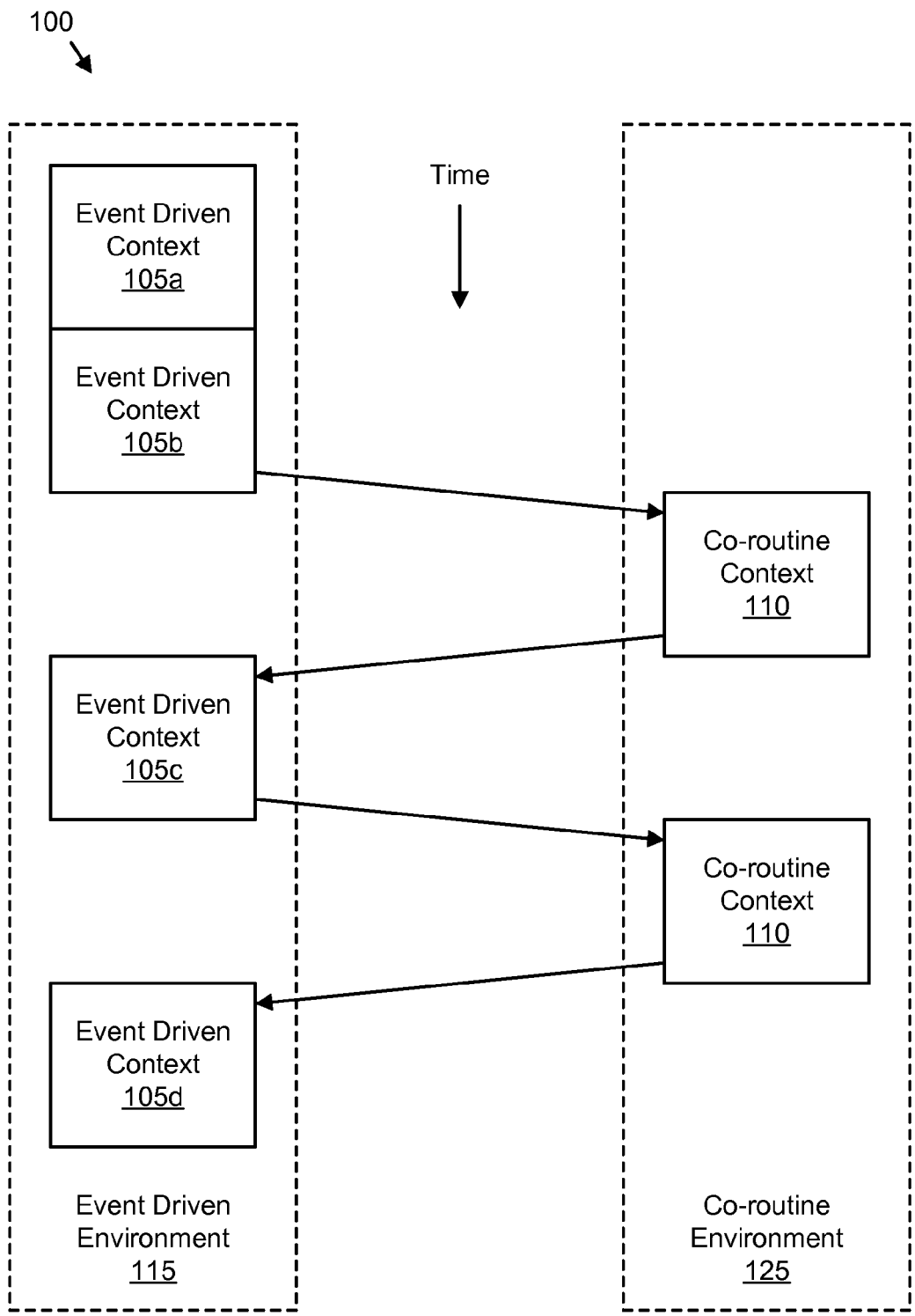
FIG. 1 is a schematic block diagram illustrating one embodiment of context execution in mixed event driven and co-routine environments in accordance with the present invention.

FIG. 1 is a schematic block diagram illustrating one embodiment of context execution in mixed event driven and co-routine environments 100 in accordance with the present invention. The environments 100 are depicted as logical spaces including an event driven environment 115 and a co-routine environment 125. As used herein, a logical space comprises processor register values, accessible software process services and data values, and the like that may be employed by an executing software process and/or context. For example, a stack and a storage allocation process are exemplary of services that may be available to a software process and/or context in an environment 100.

The event driven environment 115 may be configured to execute one or more event driven contexts 105. Each event driven context 105 may comprise a plurality of software instructions and be configured to load a stored and/or initialized context state, execute the software instructions until halted, and store a context state. An event driven context 105 initiates and/or controls a swap to a subsequent context. In one embodiment, the event driven environment 115 is configured to execute a portion of one or more event driven contexts 105 within a specified time interval.

The co-routine environment 125 is configured to execute one or more co-routine contexts 110. The co-routine environment 125 may include a limited storage space for a co-routine stack and limit access to resources by the co-routine contexts 110. Each co-routine context 110 may comprise a plurality of software instructions. In addition, each co-routine context 110 may load a stored and/or initialized context state, execute the software instructions of the co-routine context 110 until halted, and store a context state. Thus context switching is initiated and/or controlled by the co-routine context 110.

The depicted embodiment shows an exemplary execution of event driven contexts 105 and co-routine contexts 110 over time by a data processing device such as a storage controller as will be described hereafter. Execution begins with a first event driven context 105a. The first event driven context 105a swaps from the first event driven context 105a to a second event drive context 105b. In addition, the second event drive context 105b swaps from the second event driven context 105b and the event driven environment 115 to the co-routine context 110 and the co-routine environment 125.

The thread of context execution continues from the co-routine context 110 to a third event driven context 105c to the co-routine context 110 and on to a fourth event driven context 105d. Contexts 105, 110 swap to specified contexts 105, 110 in a progression rather than using a call and return from software process as in an ROC environment. As a result, the co-routine context 110 may be unable to execute a function that is configured to execute in the event driven environment 115 because the thread of execution will not return to co-routine context 110. The present invention executes an event drive function in the event driven environment 115 from the co-routine environment 125, allowing the co-routine context 110 to employ functions designed for the event driven environment 115.

Figure 2:
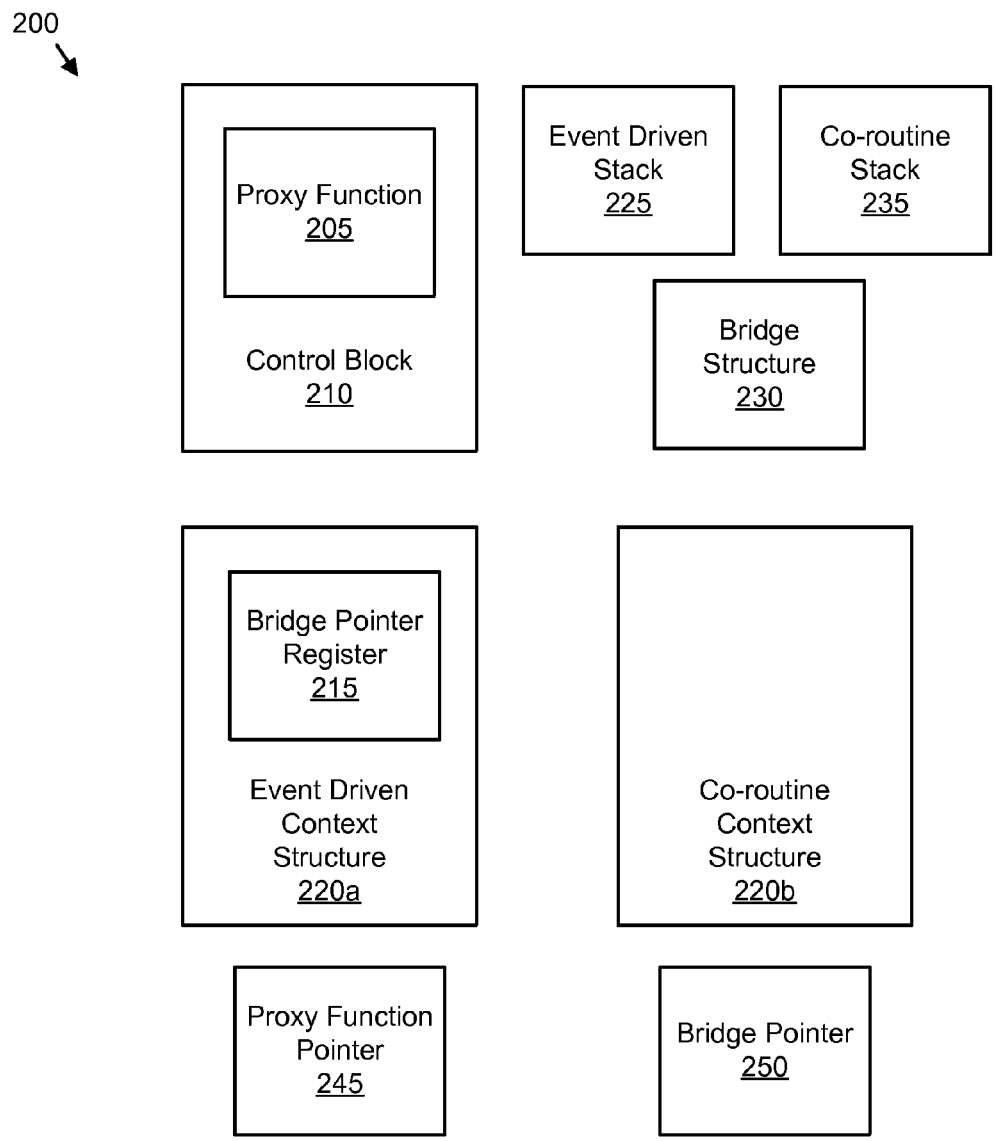
FIG. 2 is a schematic block diagram illustrating one embodiment of data structures of the present invention.

FIG. 2 is a schematic block diagram illustrating one embodiment of data structures 200 of the present invention. The data structures 200 are employed for event driven contexts 105 and co-routine contexts 110 operating in the event driven environment 115 and co-routine environment 125 of FIG. 1. As shown the data structures 200 include a proxy function 205, a control block 210, a bridge register pointer 215, one or more context structures 220, an event driven stack 225, a bridge structure 230, a co-routine stack 235, a proxy function pointer 245, and a bridge pointer 250. The description of the data structures 200 refers to elements of FIG. 1, like numbers referring to like elements. The data structures 200 support the execution of the proxy function 205 in the event driven environment 115 by a co-routine context 110 operating in the co-routine environment 125.

In one embodiment, the proxy function 205 comprises software instructions that are designed to execute in an ROC environment. One or more software instructions may be added to the proxy function 205 to allow the proxy function 205 to execute in the event driven environment 115. In one embodiment, the proxy function 205 is encapsulated in a control block 210, wherein the control block 210 provides an interface between the proxy function 205 and the event driven environment 115.

The proxy function pointer 245 is configured as the address of a specified software instruction of the proxy function 205. The address may be a memory module address that will be described hereafter. Alternatively, the address may be a storage device address as will be described hereafter. In one embodiment, the proxy function pointer 245 is an address for the control block 210. The proxy function 205 may be executed by loading the instruction pointer of the processor module with the proxy function pointer 245.

The event driven context structure 220a stores information for an event driven context 105. For example, the event driven context structure 220a may store a context state for an event driven context 105, the context state comprising contents of one or more processor register values, a processor instruction pointer value, and the like. When the context state is copied to one or more registers of processor, the processor is configured to execute the event driven context 105 as is well known to those of skill in the art. The event driven context structure 220a includes a bridge pointer register 215. The bridge pointer register 215 may be set to a null value when the co-routine context 110 swaps to the event driven context 105. However, the bridge pointer register 215 stores the bridge pointer 250 when executing the proxy function 205 as will be described hereafter.

Similarly, the co-routine context structure 220b stores information for a co-routine context 110. The co-routine context structure 220b may store a context state for the co-routine context 110 so that when the context state is copied to one or more registers of the processor module, the processor module is configured to execute the co-routine driven context 110.

The event driven environment 115 uses the event driven stack 225 as storage. In one embodiment, the event driven stack 225 is configured as last-in-first-out storage as is well known to those of skill in the art. The event driven context structure 220a may be saved to and retrieved from the event driven stack 225.

The co-routine environment 125 uses the co-routine stack 235 as storage. The co-routine stack 235 may also be configured as last-in-first-out storage. In one embodiment, the co-routine context structure 220b is saved to and retrieved from the co-routine stack 235. In one embodiment, the event driven stack 225 and the co-routine stack 235 are configured as a single stack.

The bridge structure 230 is used to store data for executing the proxy function 205. In addition, the bridge structure 230 may be used to store results from executing the proxy function 205. For example, the bridge structure may include one or more data structures configured to store parameters from a flash copy operation. The bridge pointer 250 may comprise an address of the bridge structure 230. The address may be a memory module address and/or a storage device address as will be described hereafter.

Figure 3:
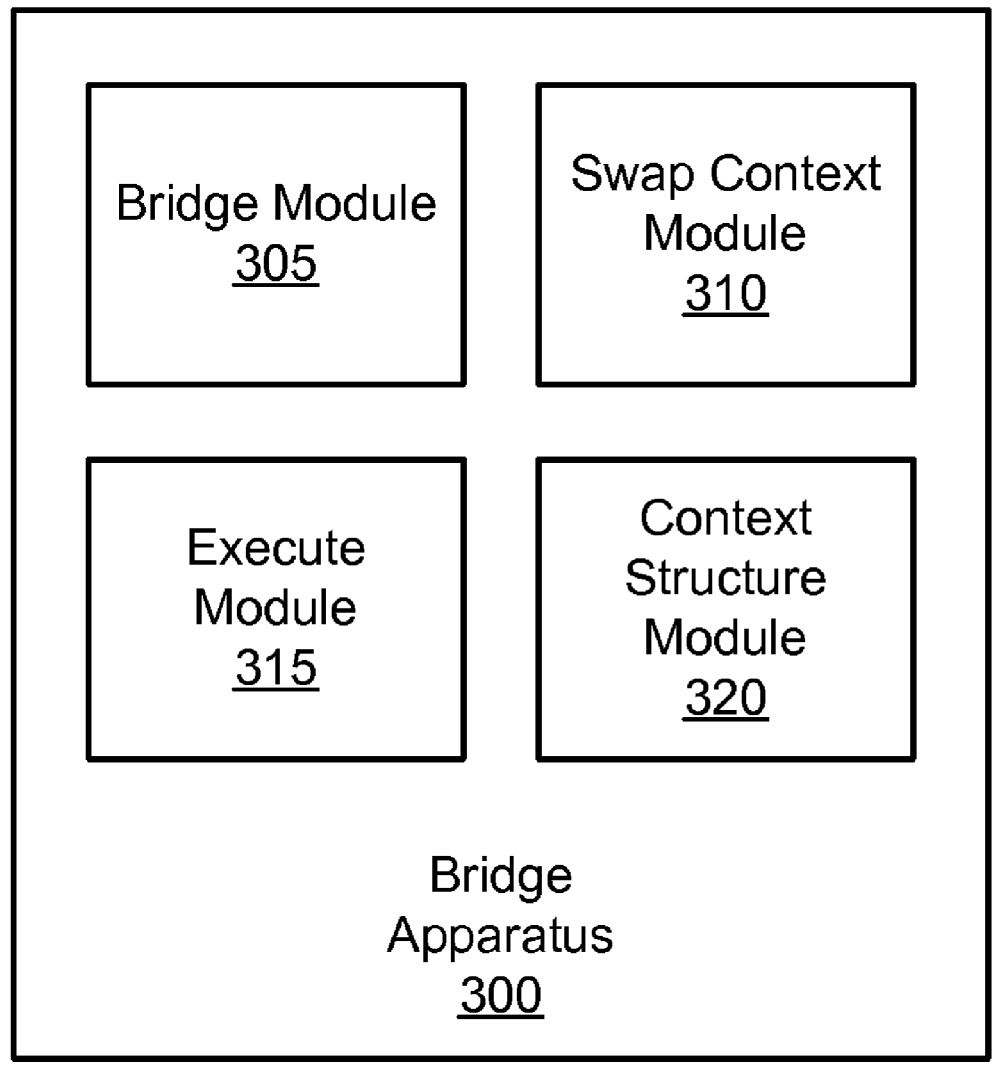
FIG. 3 is a schematic block diagram illustrating one embodiment of a bridge apparatus of the present invention.

FIG. 3 is a schematic block diagram illustrating one embodiment of a bridge apparatus 300 of the present invention. The description of the apparatus 300 refers to elements of FIGS. 1 and 2, like numbers referring to like elements. The apparatus 300 executes the proxy function 205 in the event driven environment 115 from the co-routine context 110 operating in the co-routine environment 125. As shown, the apparatus 300 includes a bridge module 305, a swap context module 310, an execute module 315, and a context structure module 320.

The bridge module 305 stores parameters and the proxy function pointer 245 for the proxy function 205 in the bridge structure 230 for the co-routine context 110 executing in the co-routine environment 125. The bridge module 305 also stores the bridge pointer 250 for the bridge structure 230 in the bridge pointer register 215 of the event driven context structure 220a.

The swap context module 310 swaps to the event driven context 105 from the co-routine context 110. For example, when the co-routine context 110 is suspended the swap context module 310 may store the context state of the co-routine context 110 in the co-routine context structure 220b, retrieve the context state of the event driven context 105 from the event driven context structure 220a, and execute the event driven context 105. Similarly, the swap context module 310 may swap from the event driven context 105 to the co-routine context 110 by storing the context state of the event driven context 105 in the event driven context structure 220a, retrieving the context state of the co-routine context 110 from the co-routine context structure 220b, and executing the co-routine context 110.

The execute module 315 retrieves the proxy function pointer 245 from the bridge structure 230 using the bridge pointer 250 if the bridge pointer register 215 does not store a null value. In one embodiment, the null value is a binary zero (0). The execute module 315 further executes the proxy function 205 and stores the results from the proxy function 205 in the bridge structure 230. The apparatus 300 executes event driven environment functions such as the proxy function 205 in the event driven environment 115 from the co-routine environment 125, allowing the co-routine contexts 110 to employ the event driven environment functions.

Figure 4:
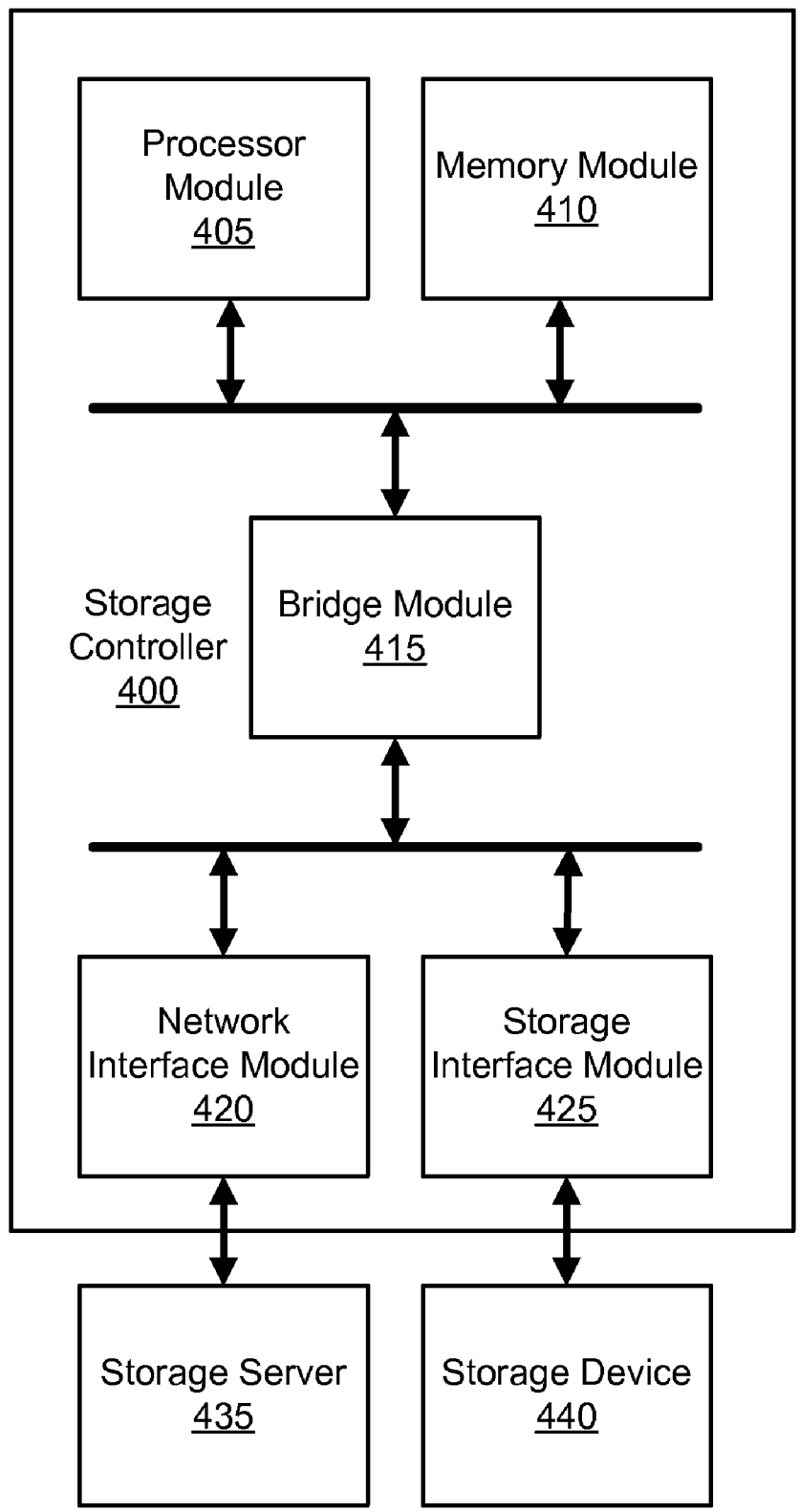
FIG. 4 is a schematic block diagram illustrating one embodiment of a storage controller of the present invention.

FIG. 4 is a schematic block diagram illustrating one embodiment of a storage controller 400 of the present invention. The description of the controller 400 refers to elements of FIGS. 1-3, like numbers referring to like elements. The controller 400 includes a processor module 405, a memory module 410, a bridge module 415, a network interface module 420, and a storage interface module 425. The controller 400 is also shown in communication with a storage server 435 and a storage device 440.

The processor module 405, memory module 410, bridge module 415, network interface module 420, and storage interface module 425 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, the network interface module 420, and the storage interface module 425 may be through semiconductor metal layers, substrate to substrate wiring, circuit card traces, and/or wires connecting the semiconductor devices.

The memory module 410 stores software instructions and data. The processor module 405 executes the software instructions and manipulates the data as is well know to those skilled in the art. In one embodiment, the memory module 410 stores and the processor module 405 executes software instructions comprising the bridge module 305, swap context module 310, execute module 315, and context structure module 320.

The memory module 410 may store software instructions and data comprising the proxy module 205, the control block 210, the context structures 220, the event driven stack 225, co-routine stack 235, bridge structure 230, proxy function pointer 245, and bridge pointer 250, at one or more addresses. For example, the memory module 410 may store the proxy module 205 at a contiguous block of addresses beginning with a first address. The proxy function pointer 245 may store the first address as is well known to those of skill in the art. Similarly, the bridge structure 230 may occupy a contiguous block of addresses beginning with a second address and the bridge pointer 250 may store the second address. In an alternate embodiment, the proxy function 205, the control block 210, the context structures 220, the event driven stack 225, co-routine stack 235, bridge structure 230, proxy function pointer 245, and bridge pointer 250 on the storage device 440.

In one embodiment, the controller 400 stores data to the storage device 440 for the storage server 435. The controller 400 may also perform operations such as flash copy operations on data stored in the storage device 440. Although for simplicity only one storage device 440 is shown, a plurality of storage devices 440 may be employed.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5A:
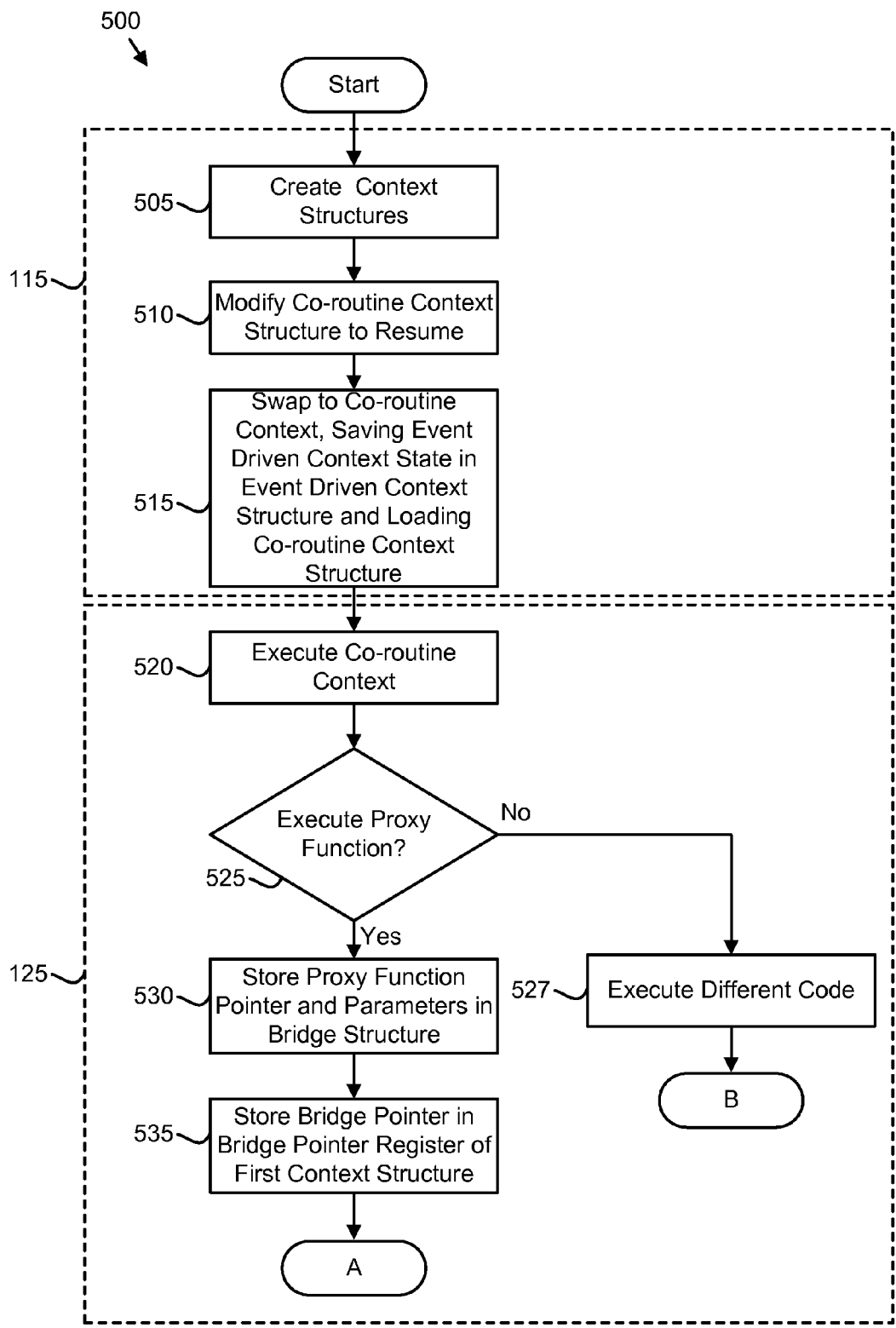
FIGS. 5A, 5B, and 5C are a schematic flow chart diagram illustrating one embodiment of a function execution method of the present invention.
Figure 5B:
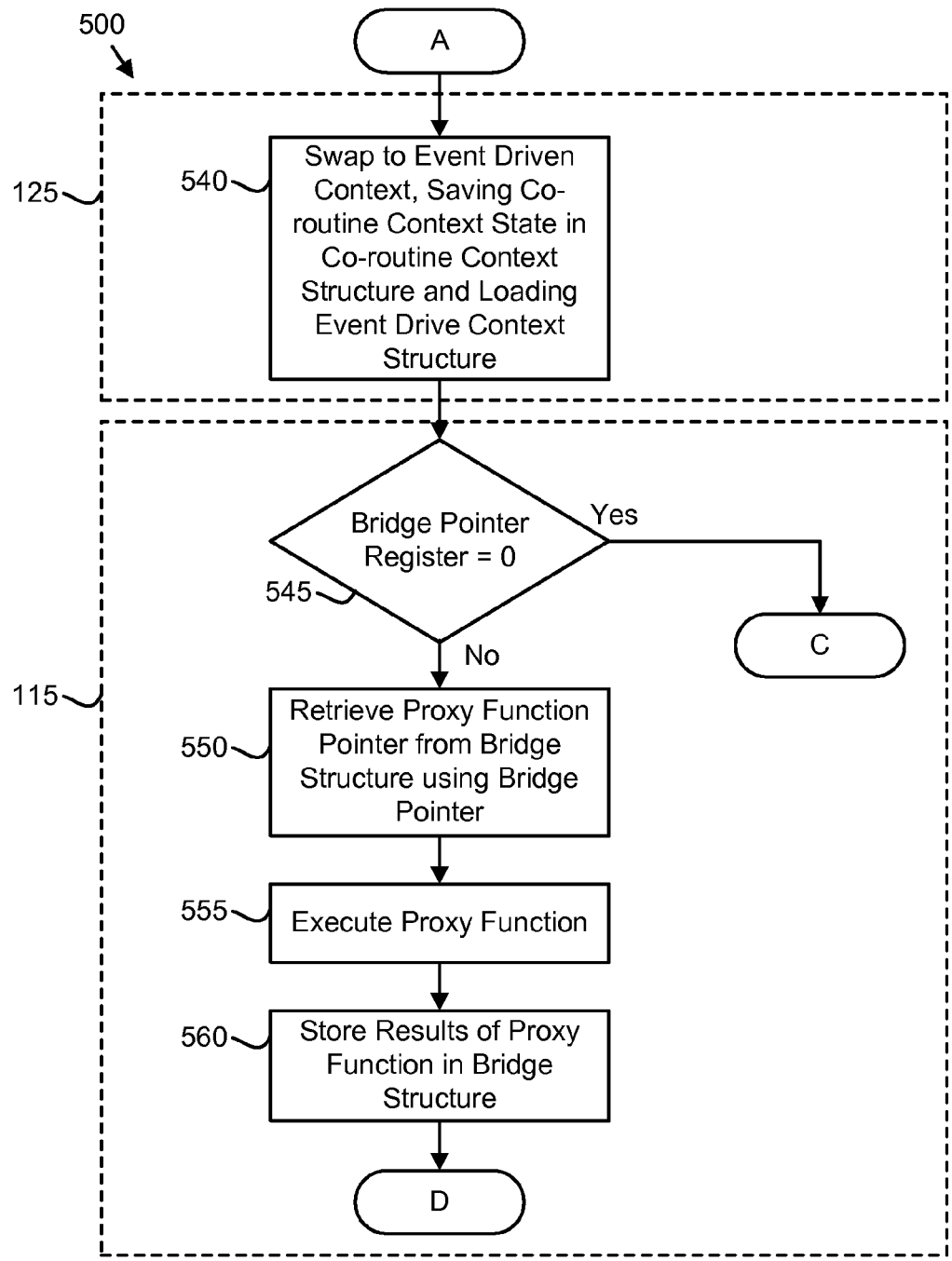
Figure 5C:
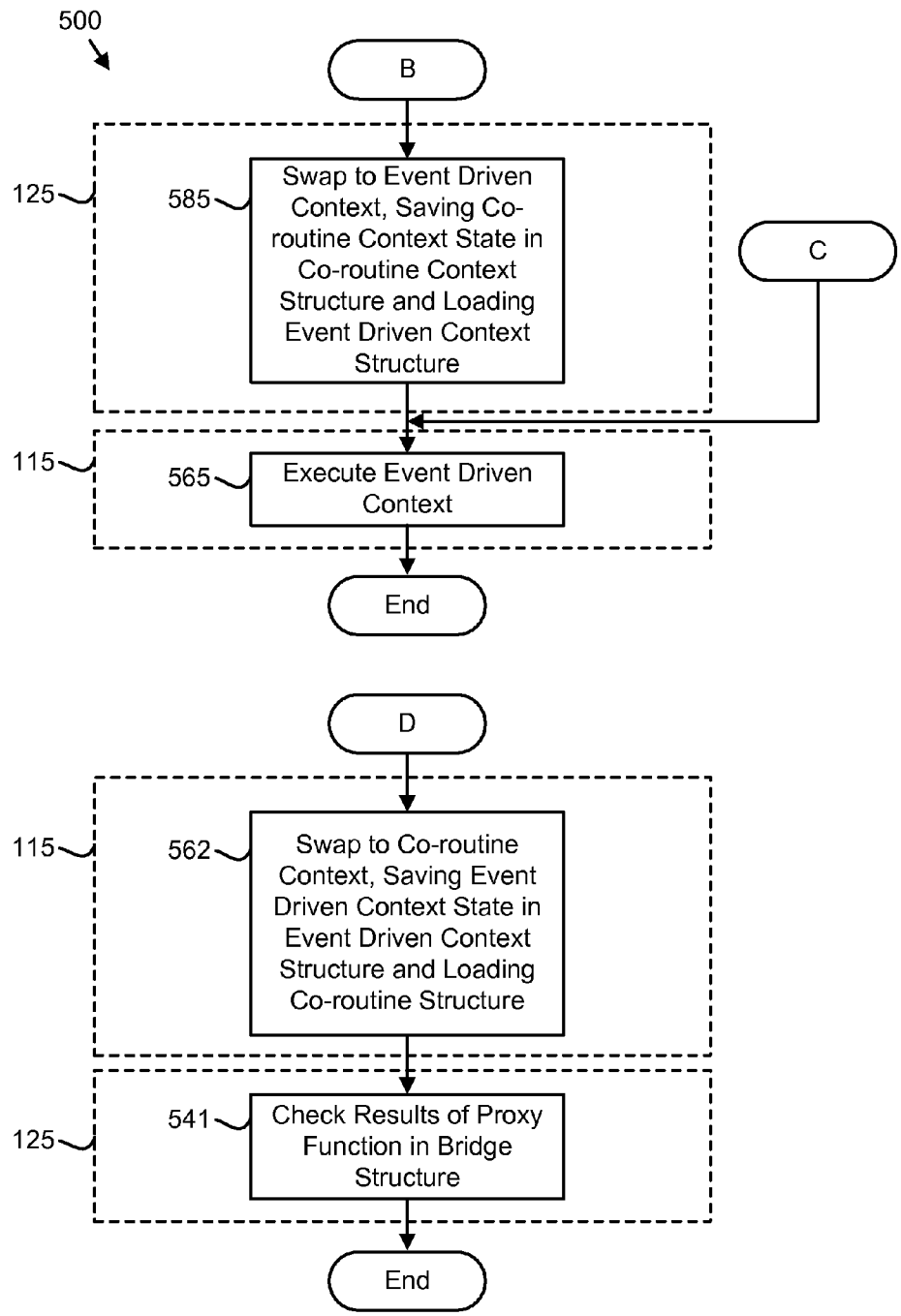

FIGS. 5A, 5B, and 5C are a schematic flow chart diagram illustrating one embodiment of a function execution method 500 of the present invention. The method 500 substantially includes the steps to carry out the functions presented above with respect to the operation of the described apparatus and system of FIGS. 1-4. The description of the method 500 refers to elements of FIGS. 1-4, like numbers referring to like elements. The method 500 allows functions designed for the event driven environment 115 to be employed by co-routine contexts 110.

The steps of the method 500 are shown as either occurring in the event driven environment 115 or the co-routine environment 125. In one embodiment, the processor module 405 employs register values and available services comprising either the event driven environment 115 or the co-routine environment 125. The processor module 405 may also execute software processes such as the bridge module 305, the swap context module 310, the execute module 315, and the context structure module 320, and contexts such as event driven contexts 105 and co-routine contexts 110 in either the event driven environment 115 or the co-routine environment 125. The processor module 405 does not concurrently operate in the event driven environment 115 and the co-routine environment 125.

In one embodiment, the context structure module 305 creates 505 the event driven context structure 220a and the co-routine context structure 220b as shown in FIG. 5A. The context structure module 305 may create 505 the event driven context structure 220a and the co-routine context structure 220b as needed. Alternatively, the context structure module 305 may create 505 the as part of an initialization process. The context structure module 305 may also populate the context structures 220 with pointers, parameters, and the like for specified contexts 105, 110.

In a certain embodiment, the swap context module 310 modifies 510 the co-routine context structure 220b to resume execution of the co-routine context 110. For example, the swap context module 310 may store a pointer for a context structure 220 of the event driven context 105 or another co-routine context that is designed to resume when the co-routine context 110 suspends execution.

The swap context module 310 further swaps 515 to the co-routine context 110. In one embodiment, the swap context module 310 swaps 515 to the co-routine context by saving a context state of the event driven context 105 to the event driven context structure 220a and loading a context state for the co-routine context 110 from the co-routine context structure 220b. The co-routine context state may include register values, an instruction pointer value, and the like that when loaded onto the processor module 405, allow the processor module 405 to execute the co-routine context 110.

The execute module 315 may execute 520 the co-routine context 110 in the co-routine environment 125. For example, the co-routine context 110 may perform one or more flash copy routines. In one embodiment, the execute module 315 examines the event driven stack 225 and the co-routine stack 235 to determine the operating environment. For example, the execute module 315 may retrieve a context structure 220 from a stack such as the event driven stack 225 and/or the co-routine stack 235. The execute module 315 may determine whether the context structure 220 is an event driven context structure 220a or a co-routine context structure 220b by examining the context structure. If the context structure 220 is the event driven context structure 220a, the execute module 315 may determine that the operating environment is the event driven environment 115 while if the context structure 220 is the co-routine context structure 220b, the execute module 315 may determine that the operating environment is the co-routine environment 125.

When the co-routine context 110 must execute another routine, the execute module 315 determines 525 if the routine is a proxy function 205. If the execute module 315 determines 525 that the routine is not a proxy function 205, the swap context module 310 may swap to and the execute module 315 execute 527 different code of the co-routine context 110. In addition, the swap context module 310 may swap 585 to the event driven context 105, saving a context state of the co-routine context 110 to the co-routine context structure 220b and loading a context state for the event driven context 105 from the event driven context structure 220a as shown in FIG. 5C. The method 500 may terminate, although the processor module 405 may continue to execute one or more event drive contexts 105 and one or more co-routine contexts 110.

If the execute module 315 determines 525 that the routine is a proxy function 205, the bridge module 305 stores 530 parameters and the proxy function pointer 245 for the proxy function 205 in the bridge structure 230 for the co-routine context 110 executing in a co-routine environment 125. In one embodiment, the bridge module 305 allocates memory addresses in the memory module 410 for the bridge structure 230. In a certain embodiment, the allocated addresses include storage space for the results of the proxy function 205.

The proxy function 205 is configured to execute in the event driven environment 115. The bridge module 305 also stores 535 the bridge pointer 250 for the bridge structure 230 in the bridge pointer register 215 of the event driven context structure 220a. The event driven context structure 220a stores the event driven context state for the event driven context 105.

As shown in FIG. 5B, the swap context module 310 swaps 540 to the event driven context 105, saving a context state of the co-routine context 110 to the co-routine context structure 220b and loading a context state for the event driven context 105 from the event driven context structure 220a. In the past, the execute module 305 would execute the event driven context 105. However, the present invention supports the execution of the proxy function 205 in the event driven environment 115.

The execute module 315 operating in the event driven environment 115 determines 545 if the bridge pointer register 215 is null. If the bridge pointer register 215 is not null, the execute module 315 retrieves 550 the proxy function pointer 245 from the bridge structure 230 using the bridge pointer 250 of the bridge pointer register 215. For example, the execute module 315 may retrieve the bridge pointer 250 and use the address of the bridge pointer 250 to retrieve the proxy pointer 245. The execute module 315 may retrieve the proxy pointer 245 by adding a specified offset to the bridge pointer 250 and retrieving the proxy pointer from the resulting address as is well known to those of skill in the art.

The execute module 315 executes 555 the proxy function 205 in the event driven environment 115. In addition, the execution module 315 may store 560 the results from executing the proxy function 205 in the bridge structure 230. For example, the execution module 315 may store 560 the results of the proxy function 205 in the storage space allocated by the bridge module 305.

As shown in FIG. 5C, the swap context module 310 swaps 562 to the co-routine context 110, saving a context state of the event driven context 105 to the event driven context structure 220a and loading the context state for the co-routine context 110 from the co-routine context structure 220b. In the co-routine environment 125, the co-routine context 110 checks 541 the results of the proxy function 205 from the bridge structure 230. As the co-routine context 110 may access the results of the proxy function 205, the method 500 terminates, although the processor module 405 may continue executing the co-routine context 110, the event driven context 105, and the like.

If the execute module 315 determines 545 that the bridge pointer register 215 contains a null value and/or the swap context module 310 swaps 585 to the event driven context 105, the execute module 315 executes 565 the event driven context 105 in the event driven environment 115 and the method 500 terminates.

The embodiment of the present invention executes the proxy function 205 in the event driven environment 115 from co-routine driven environment 125 for the co-routine context 110. The present invention allows co-routine contexts 110 to employ functions designed for the event driven environment 115.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to execute a function in a first environment from a second environment, the apparatus comprising:
a memory storing software instructions;
a processor executing the software instructions, the software instructions comprising:
a bridge module configured to store parameters and a proxy function pointer for a proxy function in a bridge structure for a second context executing in the second environment, the proxy function configured to execute in the first environment, and to store a bridge pointer for the bridge structure in a bridge pointer register of a first context structure that stores a first context state for a first context configured to execute in the first environment;
a swap context module configured to swap to the first context;
an execute module configured to retrieve the proxy function pointer from the bridge structure using the bridge pointer if the bridge pointer register is not null, execute the proxy function, and store the results of the proxy function in the bridge structure; and
the swap context module further configured to swap to the second context.

2. The apparatus of claim 1, the software instructions further comprising a context structure module configured to create the first context structure and a second context structure.

3. The apparatus of claim 2, wherein the swap context module is further configured to save a second context state of the second context in the second context structure.

4. The apparatus of claim 3, wherein the swap context module is further configured to swap to the second context using the second context structure.

5. The apparatus of claim 1, wherein the execute module is further configured to determine an operating environment by examining a stack.

6. The apparatus of claim 1, wherein the execute module is further configured to store results of the proxy function in the bridge structure.

7. The apparatus of claim 1, wherein the first and second contexts and the proxy function are configured as return-on-completion (ROC) functions.

8. A computer program product comprising a tangible memory storing a computer readable program, wherein the computer readable program when executed on a computer causes the computer to:
store parameters and a proxy function pointer for a proxy function in a bridge structure while executing a second context in a second environment, the proxy function configured to execute in a first environment;
store a bridge pointer for the bridge structure in a bridge pointer register of a first context structure that stores a first context state for a first context configured to execute in the first environment;
swap to the first context;
retrieve the proxy function pointer from the bridge structure using the bridge pointer if the bridge pointer register is not null;
execute the proxy function;
store the results of the proxy function in the bridge structure; and
swap to the second context.

9. The computer program product of claim 8, wherein the computer readable program is further configured to cause the computer to create the first context structure and a second context structure.

10. The computer program product of claim 9, wherein the computer readable program is further configured to cause the computer to save a second context state of the second context in the second context structure.

11. The computer program product of claim 10, wherein the computer readable program is further configured to cause the computer to swap to the second context using the second context structure.

12. The computer program product of claim 8, wherein the computer readable program is further configured to cause the computer to determine an operating environment by examining a stack.

13. The computer program product of claim 8, wherein the computer readable program is further configured to cause the computer to store results of the proxy function in the bridge structure.

14. The computer program product of claim 8, wherein the first and second contexts and the proxy function are configured as ROC functions.

15. A system to execute a function in an event driven environment from a co-routine environment, the system comprising:
a processor module configured to execute software processes;
a memory module configured to store the software processes, the software processes comprising
a context structure module configured to create an event driven context structure and a co-routine context structure;
a bridge module configured to store parameters and a proxy function pointer for a proxy function in a bridge structure for a co-routine context executing in the co-routine environment, the proxy function configured to execute in the event driven environment, and to store a bridge pointer for the bridge structure in a bridge pointer register of the event driven context structure that stores an event driven context state for an event driven context configured to execute in the event driven environment;
a swap context module configured to swap to the event driven context;
an execute module configured to retrieve the proxy function pointer from the bridge structure using the bridge pointer if the bridge pointer register is not null, execute the proxy function, and store the results of the proxy function in the bridge structure; and
the swap context module further configured to swap to the co-routine context.

16. The system of claim 15, wherein the swap context module is further configured to save a co-routine context state of the co-routine context in the co-routine context structure and swap to the co-routine context using the co-routine context structure.

17. The system of claim 15, wherein the execute module is further configured to determine an operating environment by examining a stack.

18. The system of claim 15, wherein the execute module is further configured to store results of the proxy function in the bridge structure.

19. The system of claim 15, wherein the first and co-routine contexts and the proxy function are configured as return-on-completion (ROC) functions.

20. A method for deploying computer infrastructure, comprising integrating computer-readable code into a computing system, wherein the code in combination with the computing system is capable of performing the following:
- creating an event driven context structure and a co-routine context structure;
- storing parameters and a proxy function pointer for a proxy function in a bridge structure while executing a co-routine context in a co-routine environment, the proxy function configured to execute in an event driven environment;
- storing a bridge pointer for the bridge structure in a bridge pointer register of the event driven context structure that stores an event driven context state for an event driven context configured to execute in the event driven environment;
- swapping to the event driven context;
- retrieving the proxy function pointer from the bridge structure using the bridge pointer if the bridge pointer register is not null;
- executing the proxy function;
- storing the results of the proxy function in the bridge structure; and
- swapping to the co-routine context.

* * * * *